3,535,265
CHROMATOGRAPHIC ADSORBENTS

Karl-Heinz Baron, Darmstadt-Eberstadt, and Erich Wieters, Darmstadt, Germany, assignors to E. Merck, AG, Darmstadt, Germany
No Drawing. Filed Jan. 10, 1967, Ser. No. 608,274
Claims priority, application Germany, Jan. 20, 1966, M 68,072
Int. Cl. C08f 45/04; C09k 1/02
U.S. Cl. 252—301.3   18 Claims

ABSTRACT OF THE DISCLOSURE

Chromatographic composition having as a binder, polymers of acrylamide and/or methacrylamide, N-di- or -mono-substituted by lower alkyl, and/or copolymers of same or with acrylic and/or methacrylic acid.

---

Applicants hereby claim the benefit of the filing date of German patent application M 68,072, filed Jan. 20, 1966.

This invention relates to adsorbent compositions, and in particular to a chromatographic composition especially useful for the production of abrasion-resistant chromatoplates and the like.

Adsorbents generally used for chromatography are silica gel, kieselguhr, aluminum oxide, magnesium silicates, cellulose, calcium phosphate, polyamides, and polycarbonates. The layers of these absorbents spread on plates or foils are, however, not sufficiently adhesive. They are sensitive to mechanical stress; furthermore, when immersing the plates or foils in the solvents used for development, that part of the layer situated in the liquid frequently becomes detached, so that the chromatogram is incompletely developed. To seek a solution of this problem, various adhesives or binding agents have, therefore, been suggested, for example starch, gypsum, carboxymethyl cellulose, or polyvinyl alcohol. Moreover, it is known that the addition of particulate silicon dioxide or aluminum oxide increases the adhesive strength of the adsorbent layer.

All known inorganic adhesives, however, are inadequate for the production of abrasion-resistant sorption layers, unless such a high proportion of gypsum is used that the concentration of the sorption agent is markedly reduced. The use of gypsum for the production of abrasion-resistant sorption layers, moreover, has the serious disadvantage that substances forming difficultly soluble calcium salts or sulfates are retained at the starting point of the chromatogram. Another disadvantage is that setting begins soon after mixing, which makes immediate processing necessary. Therefore, sorption agents containing gypsum are poorly suited for the chromatography of inorganic substances.

With respect to the commonly used organic adhesives, such as starch, a noteworthy disadvantage incident to their employment is that the resultant layers used for development cannot be sprayed with all types of color-imparting agents. For example, after the spraying of the adsorbent layer with concentrated acids and subsequent heating, the layer exhibits a dark color and makes identification of organic substances more difficult, or even impossible.

The abrasion resistance of adsorbent layers is very important as the glass plates or films are desired to be storable one upon the other without any damage to the adsorbent layers. In this way, storage, packing, and transport of the absorbent layers spread on glass plates or films would be greatly facilitated. For example, in filing chromatograms for purposes of documentation or identification, there is no problem if the layers are so abrasion-resistant that they can be neatly stacked without danger of disintegration. A cohesive abrasion-resistant adsorbent is also important for the production of self-supporting adsorbent layers which are not supported on a substrate (plate).

A principal object of this invention, therefore, is to provide improved abrasion-resistant adsorbent compositions particularly suitable for the production of chromatoplates and the like.

Another object of this invention is to provide abrasion-resistant chromatoplates, as well as self-supporting chromatostrips.

Upon further study of the specification and claims, other objects and advantages of the present invention will become apparent.

To achieve the objectives of this invention, there is added to a conventional adsorbent base, such as silica gel, kieselguhr, aluminum oxide, magnesium silicates, calcium phosphate, cellulose, polyamides, and polycarbonates, a binding amount, generally 0.1 to 10%, preferably about 2–6% by weight, based on the weight of the conventional adsorbent base, of a special polymeric binder. This binder is a polymer of methacrylamide or acrylamide wherein the amide nitrogen is optionally mono- or di-substituted by lower alkyl groups. In other words, the binder is a polymer of:

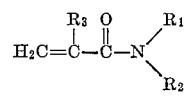

wherein $R_1$, and $R_2$, being identical or different, represent hydrogen or lower alkyl; and
$R_3$ represents hydrogen or methyl.

The polymer can be either a homopolymer, or a copolymer of monomers defined by the above formula. In addition, such monomers can be copolymerized with acrylic or methacrylic acid to yield binders of the desired characteristics. In general, the polymers are normally solid.

These polymeric binders provide very strong, adhesive, flexible, and abrasion-resistant chromatography layers. (It is also to be noted that the separating power of the adsorption agents is not impaired by these additives.) Thus, it is unnecessary for plates or foils having sorption layers containing these binding agents to be transported in special containers, but they can be superimposed one on the other without any risk of damaging the layers. In addition, by the use of these binders, adsorbent compositions can be produced which are so strong that they can be used as self-supporting layers. If desired, the adsorbent compositions of this invention can also be applied to flexible substrates, such as paper webs or foils, inasmuch as the layers themselves are also flexible.

The above-described binding agents, moreover, have the unexpected advantage that adsorbent layers employing same can be sprayed with dilute and also concentrated acids, for example, concentrated sulfuric acid, and that they can be heated without affecting the identification reactions of the separated substances. In other words, despite the addition of organic binders, the resultant layers remain light after spraying with acids and subsequent heating. This advantage equally applies to many other identification reagents frequently used in thin-layer chromatography as, for example, phosphoric acid, perchloric acid, antimony trichloride (in glacial acetic acid), anisaldehyde-sulfuric acid, p-toluenesulfonic acid, phosphomolybdic acid, phosphotungstic acid, and vanillin in various acids. In particular, it has been found that the separation of amino acids with ninhydrin is surprisingly amenable to adsorption compositions of this invention.

Another advantage of the above-mentioned binding agents is that they are insoluble or only slightly soluble in organic developing solvents.

Preferred binders of this invention are, among others, for example, homopolymers of acrylamide, methacrylamide, or acrylamides or methacrylamides substituted at the amide nitrogen by lower alkyl groups, such as methyl, ethyl, propyl, butyl, and particularly tert.-butyl. Copolymers of these acrylamides with one another and copolymers of the acrylamides with acrylic acid or methacrylic acid can also be used. When acids are employed, they represent about 2 to 50% by weight of the copolymer. Polymers having a molecular weight of at least 10,000 are preferred. If polymers of a lower molecular weight are added, higher concentrations of binding agents are generally required to obtain the same strengthening effect.

Particularly suitable polyacrylamides are, for example, those available under the trademark "Cyanamer." They are supplied in the form of dry, white, sprayable powders readily soluble in water. Homopolymers of a higher molecular weight are particularly suitable, for example, the product "Cyanamer" P250, which is a non-ionic, high molecular weight acrylamide homopolymer with a molecular weight of 5–6 million. Copolymers of acrylamide and acrylic acid are also sold commercially under these names; for example, "Cyanamer" P26 is an anionic, relatively low molecular weight copolymer of the two monomers. Mixtures of these products, which then have different molecular weight distributions, are also suitable for use as additives to adsorbents according to the present invention.

As substrates for the adsorption layers, any conventional supports, such as glass plates, metal plates or metal foils, or paper or plastic foils can be used. If the content of binding agent is high enough, i.e., between about 2% and 10%, the sorption agents of this invention generally possess such a great strength that they can be used even without supports, for example, in the form of small rods or cylinders, or thin plates. The novel adsorbent compositions are, moreover, of great importance for thin-layer chromatography since, particularly in this case, the consumer usually requires preprepared adsorption layers, that is to say, sorption layers spread on plates or foils, which have been dried and activated. Such thin layer chromatoplates are quite cohesive, and can be stored without difficulty.

In principle, the adsorption material according to the invention can contain any of the adsorption agents usually employed in layer chromatography, i.e., both in thin-layer chromatography and in preparative layer chromatography. Well suitable are, for example, silica gels having medium-sized pores and a specific area of about 500 to 600 m.$^2$/g., an average pore diameter of about 30 to 50 A., a pore volume of about 0.6 to 0.9 cm.$^3$/g. and approximately the following particle size distribution:

| | Percent by weight |
|---|---|
| $>30\mu$ | 2 |
| $6-30\mu$ | 63 |
| $<6\mu$ | 34 |

A particularly suitable kieselguhr is one that has been washed with hydrochloric acid and calcined, and has a particle size distribution such that about 85% by weight of the particles are between $5\mu$ and $30\mu$.

An especially suitable magnesium silicate is one that contains about 15.5% of MgO and about 84% of $SiO_2$ and has a particle size of less than $75\mu$.

Any aluminum oxides usually employed for chromatographic purposes can be used in the adsorption material according to the present invention. Basic, neutral, or acidic kinds can be employed, and they preferably have approximately the following particle size distribution:

| | Percent by weight |
|---|---|
| $>26\mu$ | 2 |
| $6-26\mu$ | 69 |
| $<6\mu$ | 29 |

Any commercially available form of calcium phosphate can be used, preferred forms of this material being those that have been precipitated from solutions. Hydroxyl apatites prepared according to Arch. Biochem. Biophys., 65, 132 (1956) are particularly suitable.

Cellulose powders, such as are usually used for chromatography, can also be employed. These cellulose powders generally have a maximum calcination residue of 0.08% by weight, an average degree of polymerization between about 400 and 500, and an average phase length of 2 to $20\mu$. Microcrystalline degradation products of cellulose, as already used for chromatographic purposes and obtainable commercially can also be used. The same applies with respect to the polyamides and polycarbonates to be used as basic sorption agents in the adsorption materials according to the invention, of which all the types ordinarily used for chromatography can be employed. Polyamides in this connection are polycondensation products possessing continuously the grouping —CONH— such as occurring, for instance, in nylon.

Other inorganic adhesives can also be added to the sorption materials according to the invention, if desired, in a proportion of from 2 to 7%, and preferably from 3 to 5% by weight. A suitable inorganic adhesive is, for example, extremely finely divided silicon dioxide (3 to 30 m$\mu$), which has been prepared, for example, by thermohydrolysis of silicon tetrachloride. The addition of such finely divided silicon dioxide to the basic sorption agents, silica gel, kieselguhr, and magnesium silicate, is particularly suitable.

If aluminum oxide is used as the basic sorption agent, extremely finely divided aluminum hydroxide can be added as an additional adhesive. Aluminum hydroxide gels (alumogels) are especially advantageous, such as are prepared, for example, from aluminum salt solutions by precipitation with bases, filtration, washing out, and careful drying, and having a particle size of $<1\mu$, preferably from 0.001 to $0.1\mu$.

Other organic adhesives can be added to the sorption materials according to the invention. Suitable organic adhesives are, for example, sodium carboxymethyl cellulose or polyvinyl polymerizates containing carboxyl groups, such as polyacrylic acids, polymethacrylic acids, or ethylene maleic acid copolymers or the salts thereof.

For the better recognition of colorless substances which are, however, capable of absorbing ultraviolet rays, inorganic luminous substances can also be added to the adsorption materials according to this invention. Suitable luminous substances are, for example, manganese-activated zinc silicate, magnesium tungstate or cadmium halogen phosphate, tin-activated calcium phosphate, manganese- or manganese-and-lead-activated calcium silicate, or antimony- or antimony-and-manganese-activated calcium halogen phosphate. For colorless substances absorbing ultraviolet days below 220 m$\mu$, an organic fluorescence indicator, for example, sodium 3-hydroxypyrene-5,8,10-trisulfonate, sodium 3,5-dihydroxypyrene-8,10-disulfonate, or morin can be used.

In substances absorbing ultraviolet rays in the medium range starting from 230 m$\mu$, the inorganic fluorescence indicators cause a reduction in the intensity, or extinction of the fluorescence on irradiation with short-wave ultraviolet light (254 m$\mu$), so that the bands of adsorbate stand out dark from the fluorescent area.

The organic fluorescence indicators cause an increase in the intensity of the fluorescence in the bands of adsorbate upon the effect of long-wave ultraviolet light (366 m$\mu$), so that they stand out brighter from the fluorescent area.

To prepare sorption materials according to this invention, the binding agents are thoroughly mixed with the basic sorption agents in an aqueous suspension, for example by shaking or stirring. The required water can be added either to a dry mixture of the two components, i.e., the basic sorption agent and the additive, or an aqueous suspension of one component can be added to the second component, which is either dry or likewise suspended in water. If the components of the sorption materials are first combined in powder form and then the water required to produce the suspension is added afterwards, care must be taken that the binding agent dissolves completely and the whole mass is thoroughly mixed. The resulting adsorption materials are then spread onto the supports or shaped into the desired form and dried and activated in the usual manner. For thin-layer work, the layer is usually a minimum of 50 m$\mu$ up to 200 m$\mu$, and this thickness can be increased to about 20 mm. for preparative work with thick layers.

The following table illustrates the general, preferred, and most preferred ranges of compositions in percent by weight:

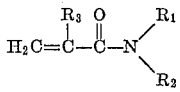

| | General | Preferred | Most preferred |
|---|---|---|---|
| Polymer of $H_2C=C(R_3)-C(O)-N(R_1)(R_2)$ optionally copolymerized with acrylic or methacrylic acid or their derivatives, respectively | 0.1–10 | 0.1–10 | 2–6 |
| Base adsorbent | 70–99.9 | 70–97.6 | 85.5–93.5 |
| Inorganic binder | 0–15 | 2–7 | 3–5 |
| Organic binder | 0–5 | 0.2–5 | 0.5–2 |
| Fluorescent substance | 0–2 | 0.1–2 | 1–1.5 |

Without further elaboration, it is believed that one skilled in the art can, using the preceding description, utilize the present invention to its fullest extent. The following preferred specific embodiments are, therefore, to be construed as merely illustrative, and not limitative of the remainder of the disclosed in any way whatsoever.

EXAMPLE 1

30 g. of a silica gel are mixed with 100 ml. of a 0.65% aqueous solution of Cyanamer® P250, a high-polymer, nonionic polyacrylamide homopolymerizate of American Cyanamid Company, the polyacrylamide added amounting to above 2%, based on the silica gel employed. After vigorous agitation, a spreadable composition of low viscosity is obtained, which is spread, with the aid of a spreader, with a thickness of 250$\mu$ onto a plastic foil (polyester foil) which has previously been cleaned with ethanol; this spreading operation is conventional. After drying, a chromatographic foil is obtained whose active layer exhibits good mechanical abrasion resistance.

Amino acid mixtures are separated, with the aid of this foil, in the solvent composition butanol/glacial acetic acid/water (40:40:20); the substances can be made visible in a conventional manner by spraying Ninhydrin thereonto.

In an analogous manner, a layer is produced containing 4% of the polyacrylamide.

EXAMPLE 2

30 g. silica gel are mixed with 100 ml. of a 2% aqueous solution of Cyanamer® P26 (=anionic, low molecular copolymerizate of acrylamide and acrylic acid, of American Cyanamid Company). Thus, the proportion of binder is about 6%. In accordance with the method described in Example 1, a Nicotherm (PVC) foil was coated with this composition.

The thus-obtained chromatograph foil makes flawless separations possible.

EXAMPLE 3

30 g. silica gel are mixed with 100 ml. of a 3% aqueous solution of Cyanamer® P26 (=anionic, relatively low-viscosity copolymerizate of acrylamide and acrylic acid of American Cyanamid Company). The proportion of binder is about 10%, based on the silica gel employed. According to the process described in Example 1, a glass plate is coated with a layer of a thickness of 500$\mu$.

A chromatoplate is obtained having a good wiping resistance, and with the aid of this plate, various amino acids can be flawlessly separated with the same developing agent as set forth in Example 1. The substances can be made visible with Ninhydrin.

EXAMPLE 4

30 g. silica gel are mixed with 100 ml. of a 3% aqueous solution of Cyanamer® P250, a high-polymer, non-ionic polyacrylamide homopolymerizate of American Cyanamid Company (corresponding to about 10%, based on the silica gel employed). A highly viscous paste is obtained; after thorough mixing and adding 20 ml. water in order to improve spreadability, the paste is applied to a glass plate in a thickness of 500$\mu$. A chromatoplate is obtained having excellent wiping resistance, and flawless separation can be conducted with the aid of this plate.

EXAMPLE 5

1.5 g. of Cyanamer® P250 in pulverulent form, being a high-polymer, nonionic polyacrylamide homopolymerizate of American Cyanamid Company, are thoroughly distributed, by stirring in a ball mill, in 30 g. silica gell. The thus-obtained powdery mixture is shaken with 100 ml. water, and then agitated until a homogeneous, moderately viscous paste is obtained. Thereupon, an adsorption layer is applied, in a conventional manner with the aid of a spreading device, in a thickness of 250$\mu$, onto a polyester foil previously treated with ethanol.

EXAMPLE 6

100 g. aluminum oxide are mixed with a mixture of 125 ml. of a 2% Cyanamer® P250 solution and 40 ml. water (corresponding to a proportion of the binder of about 2.5%). By thorough stirring of the mixture, a homogeneous distribution is effected, and the mass is applied, with the aid of a spreading device, in a thickness of 250$\mu$ to glass plates. After drying, chromatoplates are obtained having an abrasion resistant, active layer thereon.

EXAMPLE 7

100 g. aluminum oxide containing manganese-activated zinc silicate as a fluorescence indicator are thoroughly mixed with a mixture of 125 g. of a 2% Cyanamer® P250 solution with 40 ml. water. The amount of polyacrylamide added, based on aluminum oxide employed, is 2.5%. Using a spreading device, a polyester foil is provided with the thus-obtained, moderately viscous paste, in a coating thickness of 100$\mu$ of the adsorption agent mixture.

EXAMPLE 8

35 g. silica gel, with an addition of extremely finely divided SiO$_2$, are mixed in a mortar with 60 ml. of a 2/ Cyanamer® P250 solution (corresponding to about 3.4% polyacrylamide). After prolonged kneading, a highly viscous paste is obtained which can be extruded, with the aid of an extruder, in the form of a thin strand. After drying a mechanically strong, thin rodlet of adsorption material is obtained. Such a rodlet is employed for chromatographic experiments which are otherwise conducted with a chromatographic column filled with silica gel. Since in this case a self-supporting adsorption agent is employed, no work has to be expended for preparing the column. The separated substances can be made visible, when using a solidified adsorption agent without support, immediately after the chromatographic development, for example by spraying with a reagent. Furthermore, the zones of the separated substances can be obtained in an exceedingly simple manner by mechanical division, for purposes of further processing, for example for elution.

EXAMPLE 9

50 g. silica gel are added, under stirring, to 250 ml. of 1% aqueous solution of a high polymer, nonionic copolymerizate of acrylamide and tert.-butylacrylamide (proportion of monomers about 3:1). The addition of acrylamide copolymerizate is about 5%, based on the silica gel employed. After vigorous stirring, the suspension is maintained on a water bath for some time to remove included air bubbles, stirred again, and spread in a conventional manner with the aid of a spreader, in a thickness of 250μ on glass plates previously cleansed with ethanol. After drying, a thin layer chromatoplate with a strengthened active layer is obtained.

EXAMPLE 10

80 g. of a 2% aqueous acrylamide solution of a high polymer acrylamide homopolymerizate (Cyanamer® P250 of American Cyanamide Company) are mixed with 80 g. of a 2% aqueous solution of a high polymer acrylamide/tert.butylacrylamide copolymerizate (monomer ratio about 3:1). Upon adding, under stirring, 50 g. of a silica gel, a spreadable silica gel suspension is obtained. The proportion of binder added, based on the silica gel employed, is about 5%. The mixture is spread onto a polyester foil by means of a suitable spreading device, so that a coating of 120μ remains after drying. With the aid of the thus-obtained thin layer chromatoplate, having good mechanical strength and abrasion resistance, analytical separations can be conducted, it being possible to carry out detection reactions with concentrated sulfuric acid.

EXAMPLE 11

50 g. silica gel powder containing 2% of the sodium salt of a polyacrylic acid are shaken with 80 g. water and then mixed with 50 g. of a 2% aqueous solution of Cyanamer® P250, a high polymer, nonionic polyacrylamide homopolymerizate of American Cyanamid Company. After vigorous agitation, a spreadable mass is obtained which is applied onto a glass plate with the aid of a spreading device, in a thickness of 250μ.

After drying, a chromatoplate of a very good wiping resistance is obtained.

The preceding examples can be repeated with similar success by substituting the generically and specifically described reactants and operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions. Consequently, such changes and modifications are properly, equitably, and intended to be, within the full range of equivalence.

What is claimed is:

1. An adsorbent composition suitable for chromatography, comprising on a weight basis an intimate mixture of 0.1–2% of a fluorescent substance, 70–99.8% of a chromatography adsorbent selected from the group consisting of silica gel, kieselguhr, aluminum oxide, magnesium silicates, and calcium phosphate; and 0.1–10% by weight of a polymer of a monomer of the formula

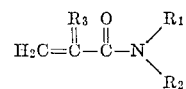

wherein
$R_1$ and $R_2$ each represents hydrogen or lower alkyl, and
$R_3$ represents hydrogen or methyl,
said polymer functioning as a binder.

2. An adsorbent composition as defined by claim 1 wherein said polymer is a homopolymer of said monomer.

3. An adsorbent composition as defined by claim 1 wherein said polymer is a copolymer of monomers of said formula.

4. An adsorbent composition as defined by claim 1 wherein said polymer is a copolymer of a monomer of said formula with a co-monomer selected from the group consisting of acrylic acid and methacrylic acid.

5. An adsorbent composition as defined by claim 1 wherein the concentration of said polymer is 2–6% by weight.

6. An adsorbent composition as defined by claim 1, further comprising 0.2–5% of an additional organic polymeric binder selected from the group consisting of polyacrylic acid, polymethacrylic acid, and a copolymer of ethylene and maleic acid.

7. An adsorbent composition as defined by claim 1 wherein said chromatography adsorbent is silica gel, said composition further comprising 2–7% of particulate silicon dioxide having a particle size of 3–30 mμ.

8. A chromatographic plate comprising a support and superimposed thereon a uniform layer of a composition as defined by claim 1.

9. A chromatographic plate comprising a support and superimposed thereon a uniform layer of a composition as defined by claim 2.

10. A chromatographic plate comprising a support and superimposed thereon a uniform layer of a composition as defined by claim 3.

11. A chromatographic plate comprising a support and superimposed thereon a uniform layer of a composition as defined by claim 4.

12. A chromatographic plate comprising a support and superimposed thereon a uniform layer of a composition as defined by claim 5.

13. A chromatographic plate comprising a support and superimposed thereon a uniform layer of a composition as defined by claim 6.

14. A chromatographic plate comprising a support and superimposed thereon a uniform layer of a composition as defined by claim 7.

15. An adsorbent composition as defined by claim 6 wherein said chromatography adsorbent is silica gel, said composition further comprising 2–7% of particulate silicon dioxide having a particle size of 3–30 mμ.

16. A chromatographic plate comprising a support and superimposed therein a uniform layer of a composition as defined by claim 15.

17. A chromatographic plate comprising a support and superimposed thereon an intimate mixture of 70–99.9% of a chromatography adsorbent selected from the group consisting of silica gel, kieselguhr, aluminum oxide, magnesium silicates, and calcium phosphate; and 0.1–10% by weight of a polymer of a monomer of the formula

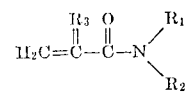

wherein
 $R_1$ and $R_2$ each represents hydrogen or lower alkyl, and
 $R_3$ represents hydrogen or methyl,
said polymer functioning as a binder.

18. A chromatographic plate as defined by claim 17 wherein said polymer is present in a concentration of 2–6%.

References Cited

UNITED STATES PATENTS

| | | | |
|---|---|---|---|
| 3,018,261 | 1/1962 | Von Friedrich et al. | 260—41.5 |
| 3,104,230 | 9/1963 | Dewey et al. | 260—17.4 |
| 3,303,043 | 2/1967 | Halpaap et al. | |

FOREIGN PATENTS

| | | |
|---|---|---|
| 231,555 | 12/1960 | Australia. |
| 644,862 | 7/1962 | Canada. |

MORRIS LIEBMAN, Primary Examiner

J. H. DERRINGTON, Assistant Examiner

U.S. Cl. X.R.

117—124, 138.8, 161; 260—17, 17.4, 41, 857, 873, 874, 897; 210—198; 252—301.2